US008866326B1

(12) United States Patent
White et al.

(10) Patent No.: US 8,866,326 B1
(45) Date of Patent: Oct. 21, 2014

(54) INTERLEAVED MOTOR CONTROLLERS FOR AN ELECTRIC TAXI SYSTEM (71) Applicant: Hamilton Sunstrand Corporation, Windsor Locks, CT (US)

(72) Inventors: Adam M. White, Belvidere, IL (US); Mustansir Kheraluwala, Lake Zurich, IL (US); Keith R. Magnus, Belvidere, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 16 days.

(21) Appl. No.: 13/859,950

(22) Filed: Apr. 10, 2013

(51) Int. Cl.
*B60L 11/02* (2006.01)
*B61C 9/38* (2006.01)
*B60L 11/06* (2006.01)

(52) U.S. Cl.
CPC *B60L 11/06* (2013.01); *G60L 11/08* (2013.01)
USPC .............................................. 290/45; 363/98

(58) Field of Classification Search
CPC . H02P 23/0004; H02P 23/0054; H02P 6/002; H02P 6/14; H02P 27/08; H02P 5/74; B60L 15/007; B60L 7/14; B60L 11/1803
USPC .............................................. 290/45; 363/98
See application file for complete search history.

(56) References Cited

U.S. PATENT DOCUMENTS

| | | | | |
|---|---|---|---|---|
| 5,382,890 A * | 1/1995 | Moh et al. | | 318/400.22 |
| 5,675,464 A * | 10/1997 | Makaran et al. | | 361/23 |
| 5,729,449 A * | 3/1998 | Takada et al. | | 363/98 |
| 5,917,721 A * | 6/1999 | Kerkman et al. | | 363/98 |
| 5,999,431 A * | 12/1999 | Sugiyama | | 363/95 |
| 6,040,673 A * | 3/2000 | Isomura et al. | | 318/615 |
| 6,049,474 A * | 4/2000 | Platnic | | 363/98 |
| 6,181,587 B1 * | 1/2001 | Kuramoto et al. | | 363/98 |
| 6,222,332 B1 * | 4/2001 | Fletcher et al. | | 318/400.24 |
| 6,324,085 B2 * | 11/2001 | Kimura et al. | | 363/132 |
| 7,002,315 B2 * | 2/2006 | Aono et al. | | 318/625 |
| 7,193,385 B2 * | 3/2007 | Emadi et al. | | 318/568.18 |
| 7,230,401 B2 * | 6/2007 | Muroi et al. | | 318/466 |
| 7,321,210 B2 * | 1/2008 | Wood | | 318/400.28 |
| 7,443,116 B2 * | 10/2008 | Kutsuna et al. | | 318/139 |
| 7,486,034 B2 * | 2/2009 | Nakamura et al. | | 318/139 |
| 7,541,763 B2 * | 6/2009 | Aono et al. | | 318/560 |
| 7,772,797 B2 * | 8/2010 | Sato et al. | | 318/801 |
| 7,834,567 B2 * | 11/2010 | Naya et al. | | 318/400.03 |
| 7,839,013 B2 * | 11/2010 | Nakamura et al. | | 307/9.1 |
| 7,859,201 B2 * | 12/2010 | Oyobe et al. | | 318/105 |
| 7,891,451 B2 * | 2/2011 | Oyobe et al. | | 180/65.275 |
| 8,084,972 B2 * | 12/2011 | Strong et al. | | 318/400.17 |
| 8,493,009 B2 * | 7/2013 | Hafner et al. | | 318/400.17 |
| 8,493,010 B2 * | 7/2013 | Rote et al. | | 318/400.23 |
| 8,674,636 B2 * | 3/2014 | Matsuo et al. | | 318/400.25 |
| 2003/0222615 A1* | 12/2003 | Aono et al. | | 318/625 |
| 2007/0029986 A1* | 2/2007 | Nakamura et al. | | 323/318 |

(Continued)

*Primary Examiner* — Pedro J Cuevas
(74) *Attorney, Agent, or Firm* — Cantor Colburn LLP (57) ABSTRACT Embodiments of the disclosure include an electric taxi system including a generator configured to provide an AC power source and a main controller configured to generate one or more PWM control signals. The electric taxi system also includes a plurality of motor controllers connected in parallel to the generator, wherein each of the plurality of motor controllers receives one of the one or more PWM control signals. The electric taxi system further includes a plurality of motors, wherein each of the plurality of motors are coupled to one of the plurality of motor controllers.

14 Claims, 6 Drawing Sheets

(56) References Cited

U.S. PATENT DOCUMENTS

| | | | |
|---|---|---|---|
| 2007/0114965 A1* | 5/2007 | Kutsuna et al. | 318/807 |
| 2008/0252239 A1* | 10/2008 | Lin et al. | 318/400.06 |
| 2008/0273865 A1* | 11/2008 | Alberkrack et al. | 388/811 |
| 2009/0067205 A1* | 3/2009 | Oyobe et al. | 363/98 |
| 2009/0121659 A1* | 5/2009 | Oyobe et al. | 318/12 |
| 2009/0128072 A1* | 5/2009 | Strong et al. | 318/400.17 |
| 2009/0160247 A1* | 6/2009 | Nakamura et al. | 307/9.1 |
| 2009/0230904 A1* | 9/2009 | Alberkrack et al. | 318/400.04 |
| 2010/0060213 A1* | 3/2010 | Hasegawa | 318/400.04 |
| 2011/0193506 A1* | 8/2011 | Hayashi et al. | 318/400.12 |
| 2011/0193509 A1* | 8/2011 | Ooyama et al. | 318/503 |
| 2011/0249421 A1* | 10/2011 | Matsuo et al. | 361/821 |
| 2011/0266984 A1* | 11/2011 | Watanabe et al. | 318/400.21 |
| 2012/0187892 A1* | 7/2012 | Tsunematsu et al. | 318/721 |
| 2013/0063061 A1* | 3/2013 | Hanada | 318/400.14 |
| 2013/0214715 A1* | 8/2013 | Guo et al. | 318/400.26 |
| 2013/0243625 A1* | 9/2013 | Iwaji et al. | 417/410.1 |
| 2013/0330207 A1* | 12/2013 | Nakajima et al. | 417/44.1 |
| 2014/0133199 A1* | 5/2014 | Matsuo et al. | 363/40 |

* cited by examiner

INTERLEAVED MOTOR CONTROLLERS FOR AN ELECTRIC TAXI SYSTEM

BACKGROUND OF THE INVENTION

The present disclosure relates to taxiing systems, and more specifically, to interleaved motor controllers for an electric taxiing system.

Taxiing systems are used to control the movement of an aircraft on the ground under its own power. An airplane uses taxiways to taxi from one place on an airport to another; for example, when moving from a terminal to the runway.

Traditional taxiing systems use thrust from propellers or jet engines to propel the aircraft forward. Reverse thrust for backing up can be generated by thrust reversers, or reversible pitch propellers. However, most aircraft are not designed to back up on their own power and must be pushed back by using an aircraft tug.

Currently there is interest in the use of electric propulsion for taxiing systems in order to realize fuel savings. At the low power settings typically used during taxiing, combustion aircraft engines operate at a low efficiency. Accordingly, electric taxiing may significantly reduce aircraft fuel burn during taxiing and while waiting in queue to take off adds to the time on the ground.

BRIEF DESCRIPTION OF THE INVENTION

According to one embodiment, an electric taxi system including a generator configured to provide an ac power source and a main controller configured to generate one or more PWM control signals. The electric taxi system also includes a plurality of motor controllers connected in parallel to the generator, wherein each of the plurality of motor controllers receives one of the one or more PWM control signals. The electric taxi system further includes a plurality of motors, wherein each of the plurality of motors are coupled to one of the plurality of motor controllers.

Accordingly to another embodiment, an electric taxi system includes an AC power source and a main controller configured to generate PWM control signals. The electric taxi system also includes a plurality of motor controllers connected in parallel to the AC power source, wherein each of the plurality of motor controllers receives PWM control signals and wherein the control signals received by each of the motor controllers are time delayed from the control signals received by the other motor controllers. The electric taxi system further includes a plurality of motors, wherein each of the plurality of motors are coupled to one of the plurality of motor controllers.

Accordingly to a further embodiment, an electric taxi system includes a generator configured to provide an AC power source and a main controller configured to generate one or more control signals. The electric taxi system also includes a plurality of motor controllers connected in parallel to the generator, wherein each of the plurality of motor controllers receives PWM control signals and wherein each of the one or more control signals is time delayed from the other of the one or more control signals. The electric taxi system further includes a plurality of motors, wherein each of the plurality of motors are coupled to one of the plurality of motor controllers. The PWM control signals for each of the plurality of motor controllers will have identical waveforms, albeit time delayed for each motor controller, when each of the motors is providing equal torque and speed (i.e. the aircraft is taxiing and not turning). During turning of the aircraft, when unequal torques and speeds are delivered by each motor, the PWM control signal waveforms for each motor controller will differ, however the center of the PWM pulses for each of the motor controllers will remain time delayed with respect to the center of the PWM pulses for the other motor controllers.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
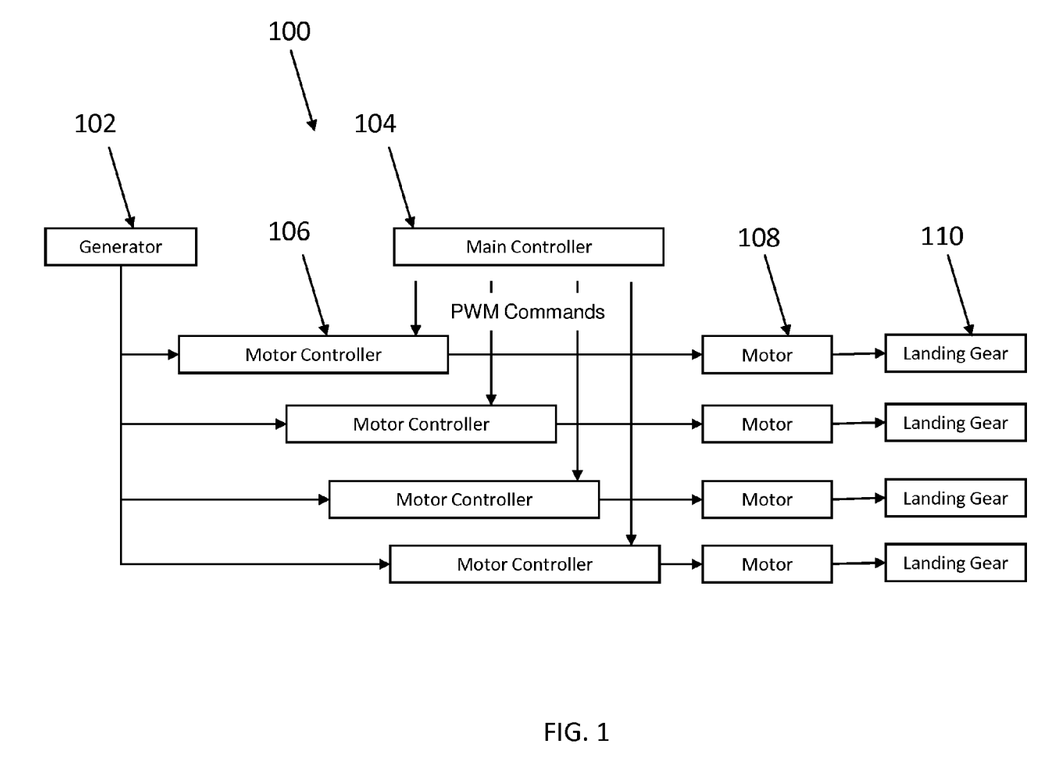
FIG. 1 is a block diagram of an electric taxi system in accordance with an embodiment of the disclosure.

Referring now to FIG. 1, an electric taxi system 100 in accordance with an embodiment of the disclosure is shown. As illustrated the electric taxi system 100 includes a generator 102, a main controller 104, a plurality of motor controllers 106 and a plurality of motors 108. In one embodiment, each of the plurality of motors 108 is an electric motor that is coupled to the aircraft landing gear 110 by a gearbox (not shown).

In one embodiment, the generator 102 is configured to supply AC power, at for example approximately 115 volts, to each of the plurality of motor controllers 106, which are each connected to the generator 102 in parallel. The multiple motor controllers 106 appear as parallel loads to the generator 102. Each of the plurality of motor controllers 106 is also configured to receive a control signal from the main controller 104. In one embodiment, the main controller 104 may be a digital signal processing (DSP) circuit, a field-programmable gate array (FPGA), an application specific integrated circuits (ASICs) or the like.

The PWM control signals provided by the main controller 104 are used by the motor controllers 106 to control the operation of the motors 108. In one embodiment, the PWM control signals provided by the main controller 104 to the motor controllers 106 are rectangular pulse waveforms, which has a pulse width that is modulated to control the speed of the motor 108. In one embodiment, the PWM control signals provided by the main controller 104 to the motor controllers 106 are interleaved, or delayed.

In one embodiment, the electric taxi system 100 includes four electric motors 108 that each has an associated motor controller 106. The main controller 104 may provide a PWM control signal to a first motor controller 106 in the form of a rectangular pulse waveform having a frequency of 10 kHz and a 100 microsecond period. The main controller 104 may provide a second PWM control signal to a second motor controller 106 in the form of a rectangular pulse waveform having a frequency of 10 kHz and a 100 microsecond period with the center of the second set of PWM pulses having a 25 microsecond delay relative to the first PWM control signal. The main controller 104 may provide a third PWM control signal to a third motor controller 106 in the form of a rectangular pulse waveform having a frequency of 10 kHz and a 100 microsecond period with the center of the third set of PWM pulses having a 50 microsecond delay relative to the first PWM control signal. The main controller 104 may provide a fourth set of PWM control signals to a fourth motor controller 106 in the form of a rectangular pulse waveforms having a frequency of 10 kHz and a 100 microsecond period with the center of the fourth set of PWM pulses having a 75 microsecond delay relative to the first PWM control signal.

In another embodiment, the electric taxi system 100 may include two electric motors 108 that each has an associated motor controller 106. The main controller 104 may provide a PWM control signal to a first motor controller 106 in the form of a rectangular pulse waveform having a frequency of 10 kHz and a 100 microsecond period. The main controller 104 may provide a second PWM control signal to a second motor controller 106 in the form of a rectangular pulse waveform having a frequency of 10 kHz and a 100 microsecond period with the center of the second set of PWM pulses having a 50 microsecond delay relative to the first PWM control signal. In other embodiments, the electric taxi system 100 may include any number of electric motors 108 that each has an associated motor controller 106.

In one embodiment, the main controller 104 is configured to generate multiple sets of PWM control signals that are each transmitted to the motor controllers 106. In another embodiment, each of the sets of PWM control signals includes a control signal for each solid state switch in the motor controller.

As a result of interleaving of the PWM control signals provided to the motor controllers 106, there is reduced distortion applied to the electric system of the aircraft, compared to a non-interleaved system. In addition, this reduction in distortion allows for a reduction in the filtering components needed, which results in a reduction of the weight of the electrical system.

Figure 2:
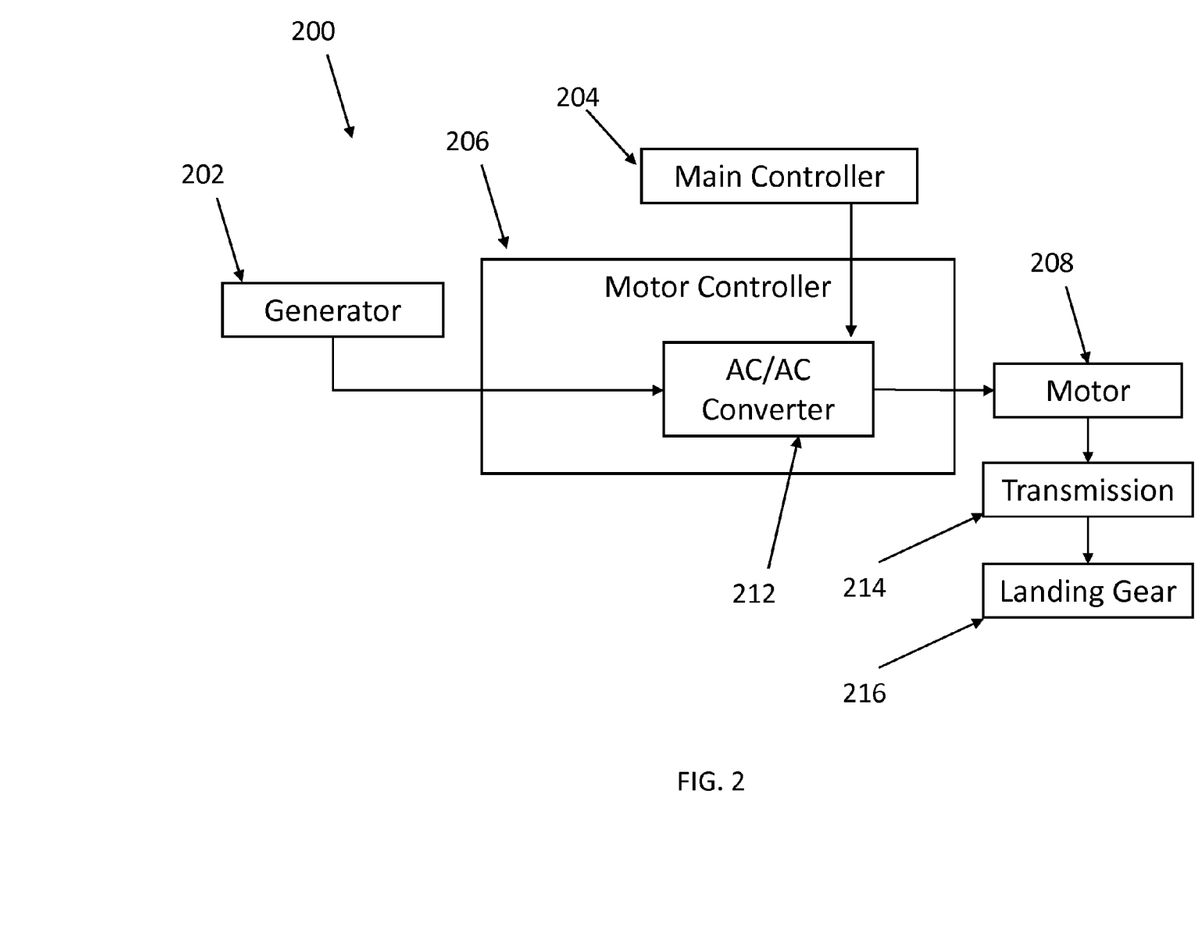
FIG. 2 is a block diagram of a portion of an electric taxi system in accordance with an embodiment of the disclosure.

Referring now to FIG. 2, a block diagram of a portion of an electric taxi system 200 in accordance with an embodiment of the disclosure is shown. As illustrated the electric taxi system 200 includes an AC power source 202, a main controller 204, a motor controller 206 and a motor 208. The AC power source 202 is configured to supply AC power to each of the motor controller 206 and the main controller 204 is configured to transmit a PWM control signal to the motor controller 206. The motor 108 is coupled to the aircraft landing gear 216 by a transmission 214. In one embodiment, the main controller 204 may be a digital signal processing (DSP) circuit, a field-programmable gate array (FPGA), an application specific integrated circuits (ASICs) or the like.

The motor controller 206 is configured to control the operation of the motor 208 in response to the PWM control signal received from the main controller 204. For example, the PWM control signal may be a pulse width modulated signal that is used to control the speed of the motor 208. In one embodiment, the motor controller 206 includes an AC/AC converter 212 that is configured to receive the AC power from the AC power source 202 and is used to provide AC power to the motor 208. In this manner, the motor controller 208 may operate and an AC/AC converter 212 and one or both of the output voltage and frequency of the AC/AC converter may be controlled, for example, by the PWM control signal.

In one embodiment, the PWM control signals generated by the main controller 208 provided to each of the individual motor controllers are identical rectangular pulse waveforms that are offset from each other. In one embodiment, the amount of the offset of the rectangular pulse waveform of one PWM control signal from the other one or more PWM control signals is based on a number of the plurality of motor controllers present in the electric taxi system. For example, in an electric taxi system that has four motors and four motor controllers, the PWM control signals may be offset by twenty-five percent of the period of the pulse waveform. In another example, in an electric taxi system that has three motors and three motor controllers, the PWM control signals may be offset by thirty-three percent of the period of the waveform. In yet another example, in an electric taxi system that has two motors and two motor controllers, the PWM control signals may be offset by fifty percent of the period of the waveform.

Figure 3:
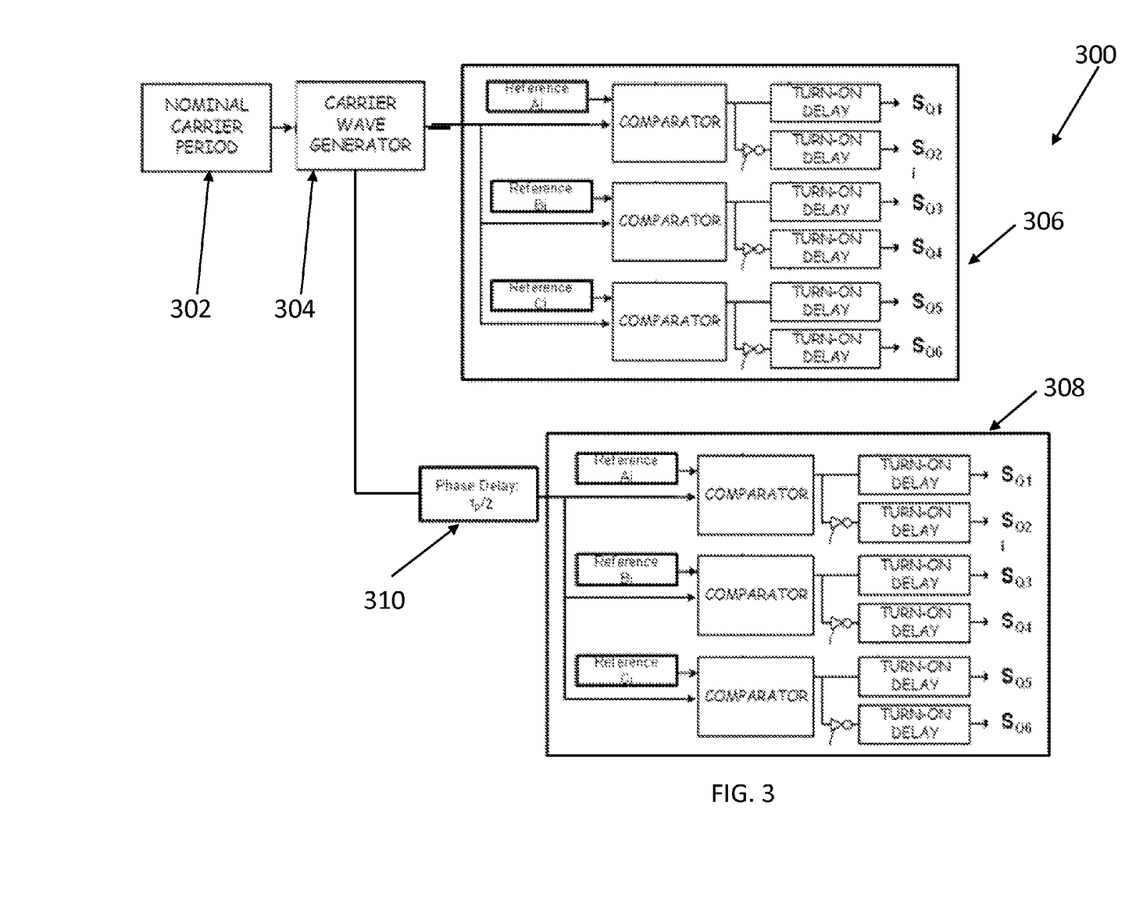
FIG. 3 is a block diagram illustrating a main controller of an electric taxi system in accordance with an embodiment of the disclosure.

Referring now to FIG. 3, a block diagram illustrating a main controller 300 of an electric taxi system in accordance with an embodiment of the disclosure is shown. As illustrated, the main controller 300 receives a nominal carrier period signal 302 and generates a carrier waveform via a waveform generator 304. The waveform is provided to one or more PWM controllers 306, 308 which are used to generate a set of PWM control signals that are provided to motor controllers for motor. The main controller 300 also includes one or more delay elements 310 that can be used to delay the waveform provided one or more of the PWM controllers. Although, the main controller 300 illustrated includes only two PWM controllers 306, 308, it will be clear to one of ordinary skill in the art that any number of PWM controllers may be used.

Figure 4:
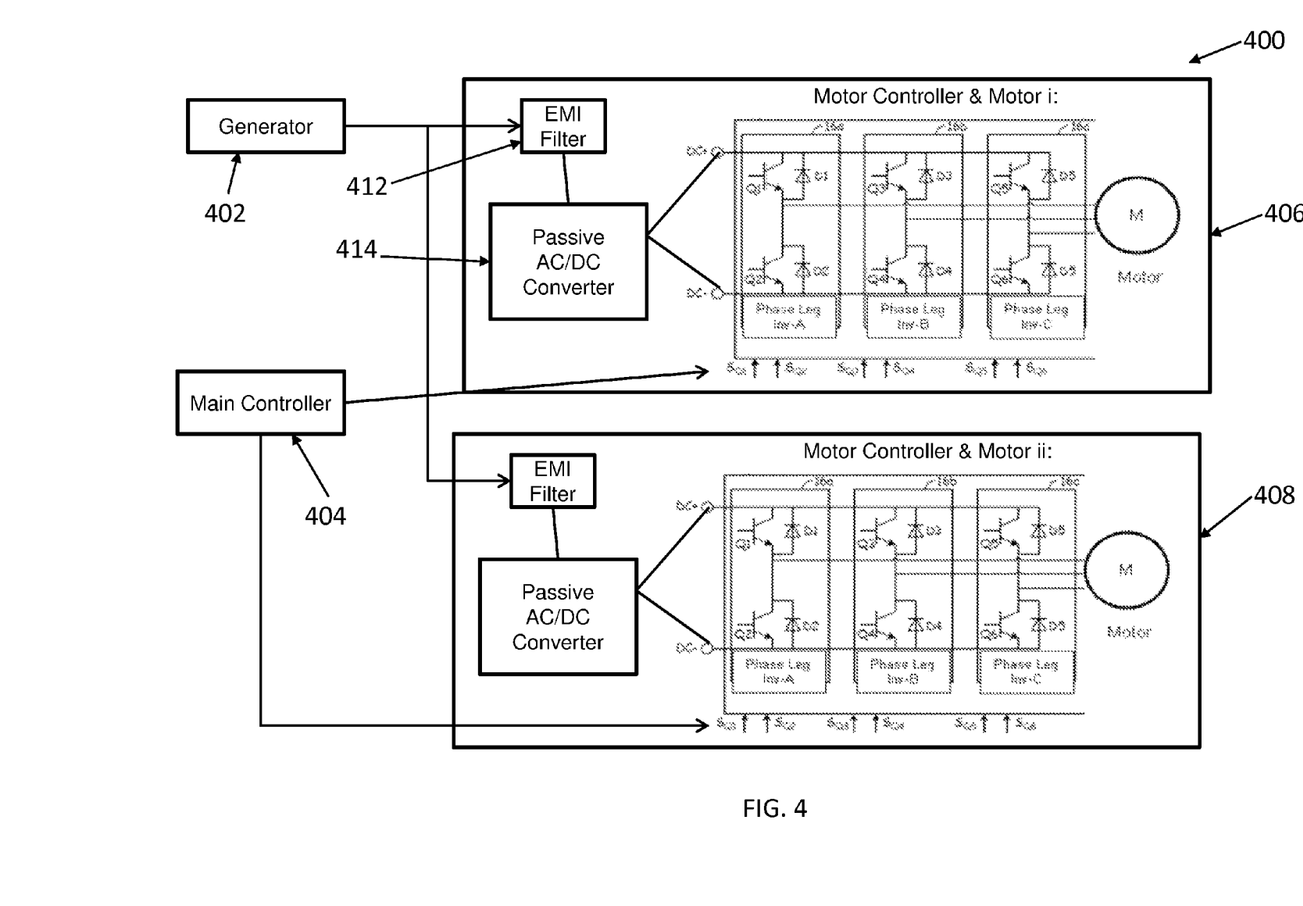
FIG. 4 is a block diagram of a portion of an electric taxi system in accordance with an embodiment of the disclosure.

Referring now to FIG. 4, a block diagram of a portion of an electric taxi system 400 in accordance with an embodiment of the disclosure is shown. As illustrated, the system 400 includes a generator 402 and a main controller 404 that are coupled to a pair of motor controllers 406, 408. The motor controllers 406, 408 each include active DC/AC motor controllers, an EMI filter 412 and a passive AC/DC converter. The motor controllers 406, 408 are powered from a single DC bus provided by the generator 402 and receive sets of PWM control signals from the main controller 404.

Figure 5:
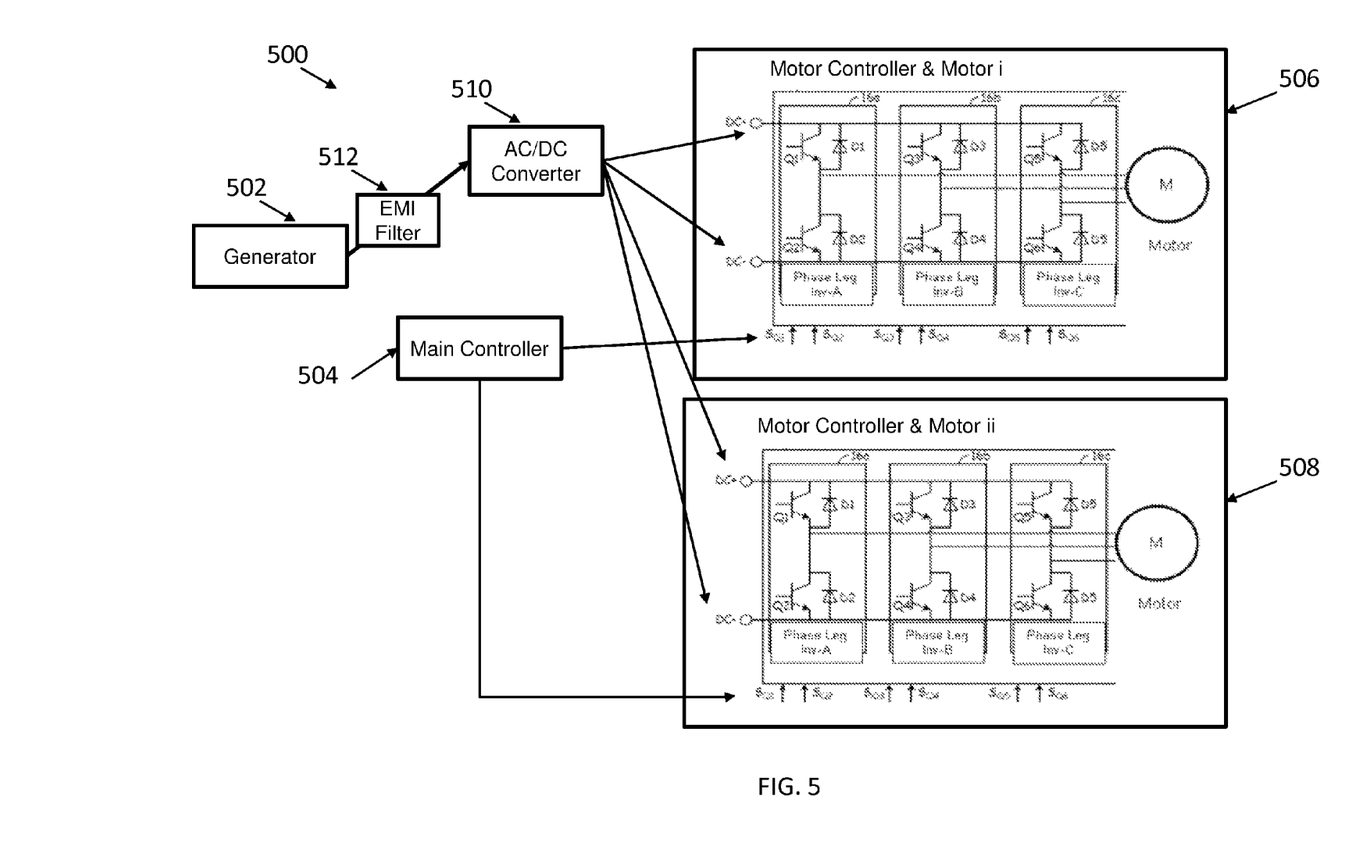
FIG. 5 is block diagram of a portion of an electric taxi system in accordance with an embodiment of the disclosure.

Referring now to FIG. 5, a block diagram of a portion of an electric taxi system 500 in accordance with an embodiment of the disclosure is shown. As illustrated, the system 500 includes a generator 502 and a main controller 504 that are coupled to a pair of AC/AC motor controllers 506, 508. The motor controllers 506, 508 receive power from an AC/DC converter 510 and receive sets of PWM control signals from the main controller 504. The AC/DC converter 510 is coupled to the generator 502 via an EMI filter 512.

Figure 6:
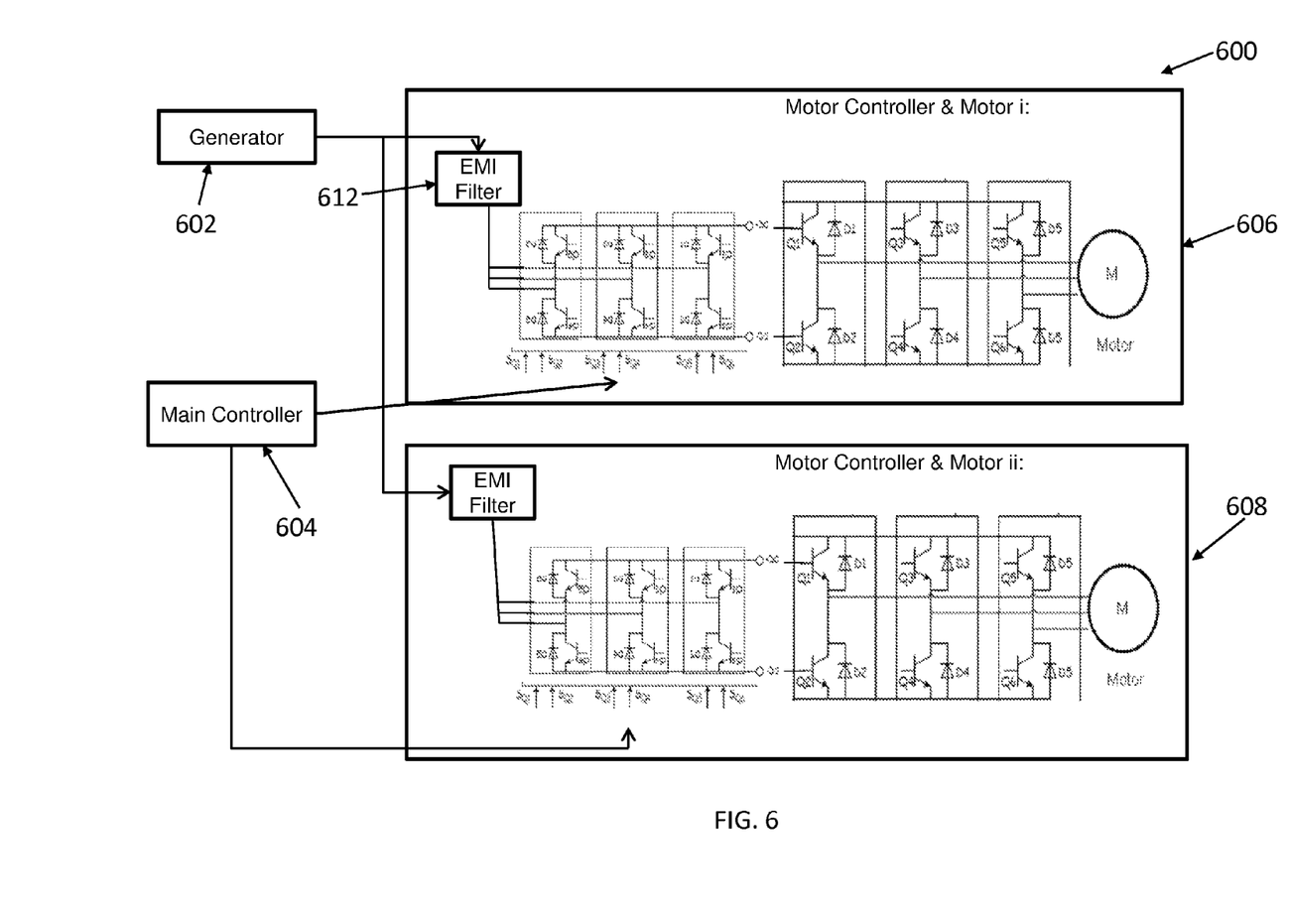
FIG. 6 is block diagram of a portion of an electric taxi system in accordance with an embodiment of the disclosure.

Referring now to FIG. 6, a block diagram of a portion of an electric taxi system 600 in accordance with an embodiment of the disclosure is shown. As illustrated, the system 600 includes a generator 602 and a main controller 604 that are coupled to a pair of AC/AC motor controllers 606, 608. The motor controllers 606, 608 each include active AC/DC converters, active DC/AC converters, and an EMI filter 612. The motor controllers 606, 608 are powered from a single DC bus provided by the generator 602 and receive sets of PWM control signals from the main controller 604. The commands for both the AC/DC and DC/AC converters are interleaved.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An electric taxi system comprising:
   a generator configured to provide an AC power source;
   a main controller configured to generate one or more pulse width modulated (PWM) control signals;
   a plurality of motor controllers connected in parallel to the generator, wherein each of the plurality of motor controllers receives one of the one or more PWM control signals; and
   a plurality of motors, wherein each of the plurality of motors are coupled to one of the plurality of motor controllers.

2. The electric taxi system of claim 1, wherein each of the one or more PWM control signals generated by the main controller is a rectangular pulse waveform.

3. The electric taxi system of claim 2, wherein the rectangular pulse waveform of each PWM control signal is offset from the rectangular pulse waveform of the other one or more PWM control signals.

4. The electric taxi system of claim 3, wherein an amount of the offset of the rectangular pulse waveform of one PWM control signal from the other one or more PWM control signals is based on a number of the plurality of motor controllers present in the electric taxi system.

5. The electric taxi system of claim 1, further comprising a landing gear that is coupled to one of the plurality of motor controllers through a transmission.

6. The electric taxi system of claim 1, wherein each of the plurality of motor controllers includes an AC/AC converter.

7. An electric taxi system comprising:
   an AC power source;
   a main controller configured to generate a pulse width modulated (PWM) control signal;
   a plurality of motor controllers connected in parallel to the AC power source, wherein each of the plurality of motor controllers receives the PWM control signal and wherein the PWM control signal received by each of the motor controllers is offset from the PWM control signals received by the other motor controllers; and
   a plurality of motors, wherein each of the plurality of motors are coupled to one of the plurality of motor controllers.

8. The electric taxi system of claim 7, wherein the PWM control signal generated by the main controller is a rectangular pulse waveform.

9. The electric taxi system of claim 8, wherein an amount of the offset based on a number of the plurality of motor controllers present in the electric taxi system.

10. The electric taxi system of claim 7, further comprising a landing gear that is coupled to one of the plurality of motor controllers through a transmission.

11. The electric taxi system of claim 7, wherein each of the plurality of motor controllers includes an AC/AC converter.

12. An electric taxi system comprising:
    a generator configured to provide an AC power source;
    a main controller configured to generate one or more identical pulse width modulated (PWM) control signals;
    a plurality of motor controllers connected in parallel to the generator, wherein each of the plurality of motor controllers receives one of the one or more identical PWM control signals and wherein each of the one or more identical PWM control signals is offset from the other of the one or more identical PWM control signals; and
    a plurality of motors, wherein each of the plurality of motors are coupled to one of the plurality of motor controllers.

13. The electric taxi system of claim 12, wherein each of the one or more identical PWM control signals generated by the main controller is a rectangular pulse waveform.

14. The electric taxi system of claim 12, wherein an amount of the offset of the one or more identical PWM control signal is based on a number of the plurality of motor controllers present in the electric taxi system.

* * * * *